United States Patent
Brambley et al.

(10) Patent No.: US 8,453,112 B1
(45) Date of Patent: May 28, 2013

(54) SYSTEMS AND METHODS FOR COLLABORATIVELY CREATING APPLICATIONS USING A MULTIPLE SOURCE FILE PROJECT THAT CAN BE ACCESSED AND EDITED LIKE A SINGLE FILE

(75) Inventors: Robert Brambley, San Francisco, CA (US); Narciso B. Jaramillo, Piedmont, CA (US); Peter Flynn, San Francisco, CA (US); Rebecca Hauck, San Francisco, CA (US); Rob Adams, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1109 days.

(21) Appl. No.: 12/270,341

(22) Filed: Nov. 13, 2008

(51) Int. Cl.
*G06F 9/44* (2006.01)

(52) U.S. Cl.
USPC ............ 717/110; 717/106; 717/113; 717/120

(58) Field of Classification Search
None
See application file for complete search history.

(56) References Cited

U.S. PATENT DOCUMENTS

| | | | |
|---|---|---|---|
| 5,706,502 A * | 1/1998 | Foley et al. .................... 717/120 |
| 6,185,577 B1 * | 2/2001 | Nainani et al. ......... 707/999.201 |
| 6,393,437 B1 * | 5/2002 | Zinda et al. .................... 717/124 |
| 6,615,192 B1 * | 9/2003 | Tagawa et al. .................. 705/57 |
| 6,654,506 B1 | 11/2003 | Luo et al. |
| 6,792,595 B1 * | 9/2004 | Storistenau et al. .......... 717/110 |
| 6,804,682 B1 * | 10/2004 | Kemper et al. ....................... 1/1 |
| 6,906,730 B2 | 6/2005 | Bossut et al. |
| 6,940,526 B2 | 9/2005 | Noda et al. |
| 7,047,518 B2 * | 5/2006 | Little et al. ..................... 717/110 |
| 7,091,974 B2 | 8/2006 | Masera et al. |
| 7,111,280 B2 * | 9/2006 | Levien et al. ................. 717/120 |
| 7,133,050 B2 | 11/2006 | Schowtka |
| 7,180,528 B2 | 2/2007 | Bossut et al. |
| 7,265,763 B2 | 9/2007 | Bossut et al. |
| 7,286,999 B2 * | 10/2007 | Majd et al. .................... 717/106 |
| 7,386,834 B2 * | 6/2008 | Van De Vanter et al. ...... 717/110 |
| 7,503,012 B2 * | 3/2009 | Chen et al. ..................... 715/769 |
| 7,503,034 B2 * | 3/2009 | Berg et al. ..................... 717/120 |
| 7,506,342 B2 * | 3/2009 | Mousseau et al. ............ 719/320 |
| 7,530,079 B2 * | 5/2009 | Stubbs et al. ................. 719/320 |
| 7,581,206 B2 * | 8/2009 | Saad et al. .................... 717/106 |
| 7,644,390 B2 * | 1/2010 | Khodabandehloo et al. . 717/105 |

(Continued)

OTHER PUBLICATIONS

Apple, Inc., "Working wih Xcode: Building Applications for the Future", 2006, published online; [retrieved on Jan. 3, 2012]; Retrieved from NPLs fo U.S. Appl. No. 11/470,863 (now PN. 7,530,079 B2); pp. 1-8.*

(Continued)

*Primary Examiner* — Thuy Dao
*Assistant Examiner* — Xi D Chen
(74) *Attorney, Agent, or Firm* — Kilpatrick Townsend & Stockton LLP (57) ABSTRACT

Certain embodiments facilitate collaboration between designers and developers in the creation of software applications. Designers and developers can work on the same multi-file-based software development project, without the designer having to address or even be aware of the multi-file structure of the project or the management of different versions of the project. Instead the designer can receive and send the project as a single file and work with it as if it were a single document. A developer or another user can address conflicts and other versioning issues that may result from collaborators making changes concurrently.

42 Claims, 4 Drawing Sheets

U.S. PATENT DOCUMENTS

| | | | | |
|---|---|---|---|---|
| 7,647,588 | B2* | 1/2010 | Cyphers | 717/176 |
| 7,661,089 | B2* | 2/2010 | Cope et al. | 717/106 |
| 7,669,199 | B2* | 2/2010 | Cope et al. | 717/106 |
| 7,675,528 | B2 | 3/2010 | Walker et al. | |
| 7,683,916 | B2 | 3/2010 | Bossut et al. | |
| 7,730,035 | B2* | 6/2010 | Berger et al. | 707/661 |
| 7,870,535 | B2* | 1/2011 | Rippert, Jr. et al. | 717/106 |
| 7,971,180 | B2* | 6/2011 | Kreamer et al. | 717/120 |
| 8,006,223 | B2* | 8/2011 | Boulineau et al. | 717/120 |
| 8,032,860 | B2* | 10/2011 | Piehler et al. | 717/110 |
| 8,266,588 | B2* | 9/2012 | Abdelhadi et al. | 717/120 |
| 8,271,944 | B2* | 9/2012 | Austin et al. | 717/113 |
| 8,336,026 | B2* | 12/2012 | Chaar et al. | 717/113 |
| 2002/0165883 | A1* | 11/2002 | Sans et al. | 707/530 |
| 2004/0205706 | A1* | 10/2004 | Portwood | 717/113 |
| 2004/0257380 | A1 | 12/2004 | Herbert et al. | |
| 2005/0044531 | A1* | 2/2005 | Chawla et al. | 717/122 |
| 2006/0090154 | A1* | 4/2006 | Bustelo et al. | 717/110 |
| 2007/0101256 | A1* | 5/2007 | Simonyi | 715/511 |
| 2010/0131922 | A1* | 5/2010 | Shenfield et al. | 717/110 |
| 2011/0302556 | A1* | 12/2011 | Drukman et al. | 717/113 |
| 2012/0151436 | A1* | 6/2012 | Ahadian et al. | 717/113 |

OTHER PUBLICATIONS

Tanaka, et al., "Live Document Framework for Re-editing and Redistributing Contents in WWW", 2002, published online; [retrieved on Jan. 5, 2012]; Retrieved from Internet <URL:http://km.meme.hokudai.ac.jp/people/itok/work/pdf/Tanakaltok-EJC-2002.pdf>; pp. 1-18.*

ARM Limited., "ARM Developer Suite Version 1.2 CodeWarrier IDE Guide", 2001, published online; [Retrieved on Jan. 3, 2012]; Retreived from Internet <URL:http://www.cis.gvsu.edu/~wolffe/courses/cs459/docs/ADS_CodeWarrierIDEGuide.pdf>; pp. 1-464.*

Gracia, et al., "A Double-MOdel Approach to Achieve Effective Model-View Separation in Template Based Web Applications", 2007, Springer-Verlag Berlin Heidelberg; [retrieved on Jan. 4, 2012]; Retrieved from Internet <URL:http://www.yeastemplates.org/articles/JST-ICWE2007.pdf>;pp. 442-456.*

Szczur, Sheppard, "TAE Plus: Transportable Applicatins Environment Plus: A User Interface Development Environment"; ACM 1993; [retrieved on Jan. 3, 2012]; Retrieved from Internet <URL:http://dl.acm.org/citation.cfm?id=151509>;pp. 76-101.*

Chamberland et al., "IBM VisualAge for Java", 1998, IBM Systems Journal; [retrieved on Jan. 25, 2013]; Retrieved from Internet <URL:http://ieeexplore.ieee.org/stamp/stamp.jsp?tp=&arnumber=5387112>;pp. 386-408.*

Christodoulou, Styliaras, "Digital Art 2.0: Art meets Web 2.0 trend"; 2008, ACM ; [retrieved on Jan. 25, 2013]; Retrieved from Internet <URL:http://dl.acm.org/citation.cfm?id=1413634>;pp. 158-165.*

Kumar et al., "The HotMedia Architecture: Progressive and Interactive Rich Media for the Internet"; 2001, IEEE; [retrieved on Jan. 25, 2013]; Retrieved from Internet <URL:http://ieeexplore.ieee.org/stamp/stamp.jsp?tp=&arnumber=923824>;pp. 253-267.*

Myers et al., "A Multi-View Intelligent Editor for Digital Video Libraries"; 2001, ACM; [retrieved on Jan. 25, 2013]; Retrieved from Internet <URL:http://dl.acm.org/citation.cfm?id=379437>;pp158-165.>;pp106-115.*

"Subversion: Subversion Features," http://subversion, tigris.org/features.html 3 pages, downloaded from the Internet on Nov. 3, 2008.

"Subversion: Subversion 1.5 Release Notes," http://subversion.tigris.org/svn_1.5_releasenotes.html 17 pages, downloaded from the Internet on Nov. 3, 2008.

Non Final Office Action in related U.S. Appl. No. 12/330,966 dated Jan. 18, 2012, 12 pages.

\* cited by examiner

SYSTEMS AND METHODS FOR COLLABORATIVELY CREATING APPLICATIONS USING A MULTIPLE SOURCE FILE PROJECT THAT CAN BE ACCESSED AND EDITED LIKE A SINGLE FILE

FIELD

The present disclosure relates generally to developing computer software applications and content and specifically to applications used for such development.

BACKGROUND

Creating computer content and other applications, including desktop applications, Web pages, and rich Internet applications, generally involves separate stages and often involves two or more sets of people with very different skill sets. Generally, designers generate images of an application's appearance, for example, using a drawing program like Adobe® Photoshop®, and separately write specifications of how they want the application to behave, for example, when the user moves the mouse over a given part of the screen. Developers then take the images and specifications and develop a working application, generally by manually coding such an application. This two-stage design-development process can be inefficient and inaccurate. Discrepancies often require additional iterations of the design-development process and, thus, additional effort by both designer and developer. The use of declarative languages, platforms like Adobe's® Flex® platform, and other technologies have helped reduce the gap in the design and development process. However, inefficiencies and inaccuracies remain.

Developing software applications frequently involves creating and managing development projects having multiple source code files. In the context of an integrated development environment ("IDE"), application creators typically must keep track of these individual files and develop the application based on their understanding of how the files relate to each other. Because each file typically has its own editor window for editing, developer actions such as undo and redo can be limited to the context of the individual file being edited. Developers also frequently use granular source control systems that require manual steps to manage versioning for individual files so that if two developers make changes to the same file, there is a process for merging the changes.

Unlike developers, designers typically create graphics, interfaces, and other visual and appearance attributes using software applications that present the material being developed as a single document file. For designers, edits to anything in the entire project are viewed as edits to that one document file. User actions, such as, for example, undo commands, redo commands, and save commands, function globally with respect to the entire project rather than operating on a single portion of a project. Thus, many designers are accustomed to working with a user interface that presents individual components as if such components where all part of the same document or file.

The different environments that designers and developers are accustomed to working in presents various hurdles in collaborative development. Designers are unaccustomed to working within multi-source-file projects and managing versioning, source control workflows, granular file merges, and merging code. Designers therefore tend to contribute indirectly by submitting ideas and graphics to a developer who then has to implement the ideas and graphics in the project. Existing development applications thus fail to adequately facilitate collaboration between designers and developers in certain ways.

SUMMARY

Certain embodiments facilitate collaboration between designers and developers in the creation of software applications. Designers and developers can work on the same multi-file-based software development project, without the designer having to address or even be aware of the multi-file structure of the project or the management of different versions of the project. Instead the designer can receive and send the project as a single file and work with it as if it were a single document. A developer or another user can address conflicts and other versioning issues that may result from collaborators making changes concurrently.

One embodiment is a method of working with a single file version of a multi-file project. The method comprises receiving a single file. The single file packages the multiple files of the multi-file project together. When the project is opened in an editing tool, the method involves creating a temporary storage structure and extracting the multiple files of the multi-file project from the single file into the temporary storage structure. When one or more edits are received, the temporary storage structure is updated using the edit or edits. This may involve, for example, identifying a file or files of the multi-file project extracted in the temporary storage structure to update and updating that file or files using the edit or edits to the multi-file project. The method may also involve saving an edited version of the single file using the updated temporary storage structure.

Another embodiment is a method of collaborating on the development of an application. The method involves providing a version of a project for use in an editing application that allows the project to be edited. The version of the project is provided with a baseline usable to identify any changes, including potentially conflicting changes made during a time period associated with provision of the version of the project. The method further involves receiving a changed version of the project, identifying changes using the baseline and the changed version of the project, and identifying a subset of those changes that potentially conflict with changes made to another copy of the project available to the receiver. The method may then involve presenting the potentially conflicting changes for merger with the project. Accordingly, this method, in some cases, allows the responsibility for merging changes to be shifted to a user other than the user making the changes. The method may also facilitate merging changes from multiple users at once. For example, identifying potentially conflicting changes may further comprise using changes made to another version of the project during the time period associated with the provision of the version of the project to the editing application. The user responsible for merging changes may be presented with a merge tool that presents various changes to a given file of a multi-file project, identifies who made the changes, and/or provides refactoring information to allow the user to decide an appropriate merger action.

In other embodiments, a computer-readable medium (such as, for example, random access memory or a computer disk) comprises code for carrying out these methods.

These embodiments are mentioned not to limit or define the invention, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages are better understood when the following Detailed Description is read with reference to the accompanying drawings, wherein.

DETAILED DESCRIPTION

Certain embodiments facilitate collaboration between designers and developers in the creation of software applications. Designers and developers can work on the same multi-file-based software development project, without the designer having to address or even be aware of the multi-file structure of the project or the management of different versions of the project. Instead the designer can receive and send the project as a single file and work with it as if it were a single document. The term "file" is used herein to refer to a conceptual data unit regardless of whether it is actually directly a file on disk that an operating system can access. The terms "project" and "multi-file project" refer to a collection of files used in creating an application. The term "project files" thus refers to the individual files of a multi-file project. The designer or other user can work with the project as a "single document" meaning that the user can use cross-project operations that operate like single-file operations, while a developer or other user can work with the multiple project files as separate, independent entities.

Various aspects of certain embodiments are introduced here with an example involving creating an application that provides a user interface with functionality controllable by the application user and graphics of controls and other components of the applications. Development of such an exemplary application may involve creating and editing a project containing multiple source files. As a specific example, the project may have a file corresponding to a main application and a number of subcomponents represented by separate files that provide or define the graphics and/or other features of the application. The main file may specify the layout of components of the application, while other files provide information about the appearance of certain components, such as the appearance of a particular button or image.

The creation and modification of this exemplary application may involve the efforts of multiple people using different creation applications. For example, a designer may position components for the layout of the user interface of the application and create and incorporate specific images and other visual components. A developer may specify or program various functionality implemented in the application, such as, for example, specifying that when a particular button is clicked a particular list will be populated with data from a database.

The designer and developer may use different applications to work with the project. The developer, for example, may use an IDE development application and the designer may use an application that simplifies the designer's interaction with the project. For example, the designer may execute a design-focused application and access the project by a "project open" command and then work with the project as a single file and a single document. For example, the designer may actually receive a single file, work with it and then send it back or otherwise check it back in for synchronization with any other work being done on the project by other designers and developers. While working with the project, the designer may work with the single file like other files he/she is accustomed to working with, saving it as a file on an operating system desktop, moving it around, e-mailing it, etc.

The single file accessed by the designer may be a packaged version of the entire project that can be used by the designers' design application. The design application may extract and use the project components without the designer having to manually work with or even be aware of the multiple project files. For example, the design application may create a structure such as a folder that may be hidden or otherwise not exposed directly to the user. This structure or folder can mimic or represent the multi-file structure of the project and can be modified as the designer interacts with the application to track ongoing changes. When the designer takes action, some of those actions result in files or components of the structure or folder being updated, added, or deleted. When the designer selects a "save" command to save the project, the structure or folder can be saved as a single file. The designer can later return the single file containing the modified project to the source from which it was accessed or checked out. Accordingly, the designer can make changes in parallel with other designers and developers. In some cases, a developer is able to easily merge changes after a designer sends back or otherwise checks back in a project. The designer may thus not need to be concerned about synchronization or conflicts and can simply work with the project as a single file and single document.

This illustrative example is given to introduce the reader to the general subject matter discussed herein. The disclosure is not limited to this example. The following sections describe various additional embodiments and examples of methods and systems.

Illustrative System Configuration

Figure 1:
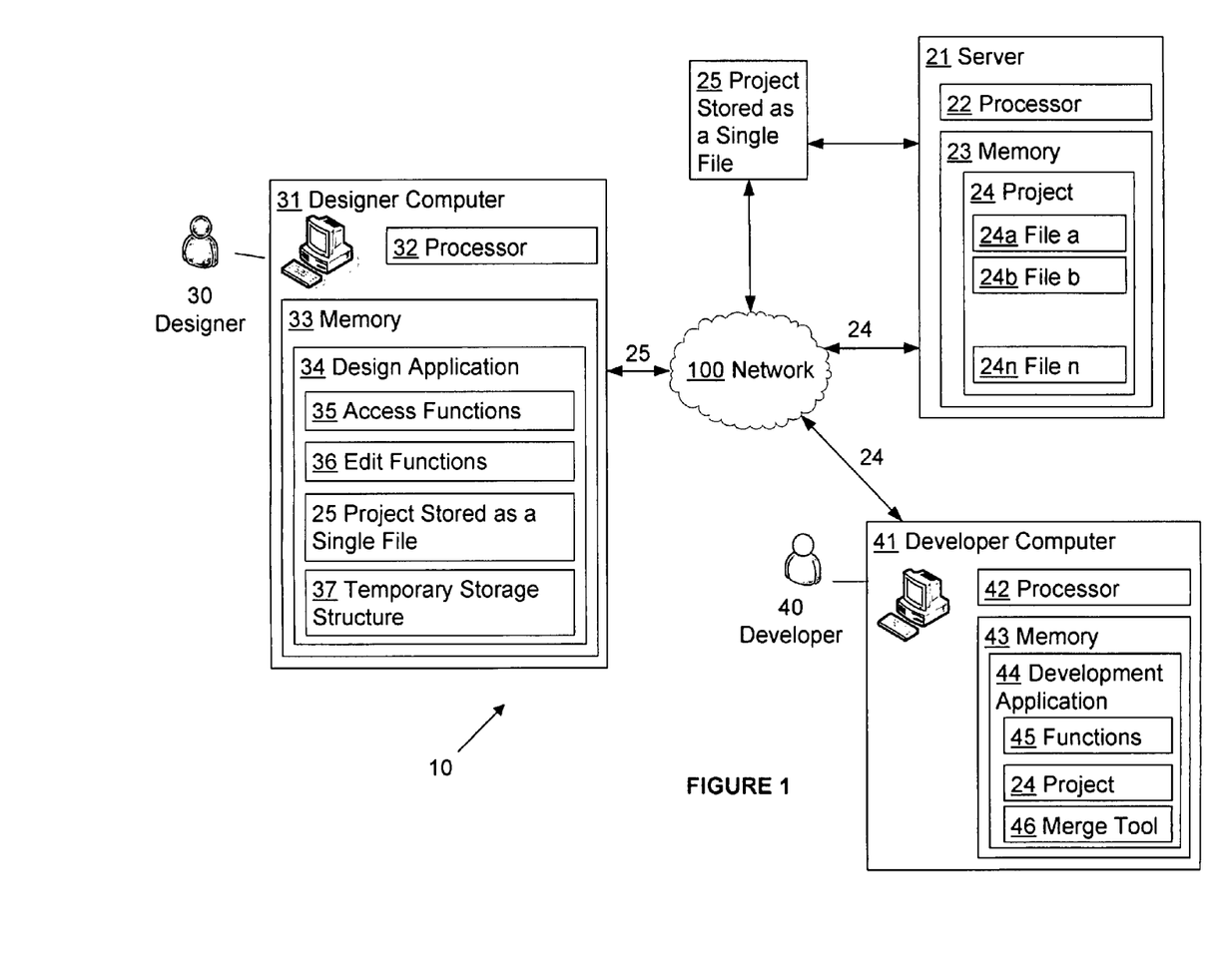
FIG. 1 is a system diagram illustrating design and development environments according to one embodiment.

FIG. 1 is a system diagram illustrating design and development environments according to one embodiment. Other embodiments may be utilized. The system 10 shown in FIG. 1 comprises a wired or wireless network 100 connecting a server 21, a designer 30 using a designer computer 31, and a developer 40 using a developer computer 41. The devices 21, 31, 41 each may comprise a computer-readable medium such as a random access memory (RAM) 23, 33, 43, coupled to a processor 22, 32, 42 that executes computer-executable program instructions stored in memory.

As shown in FIG. 1, the server 21 stores a project 24 that may comprise multiple files 24a-n. The server 21 provides the project for the designer 30 and developer 40 to edit. For example, the server may send a copy of the project 24 to the developer computer 41, allowing the developer 40 to use various editing and development functions 45 of development application 44 to edit and develop the project 24. The development application 44 may also include a merge tool 46 that allows the developer to control and manage versioning of the project. For example, the merge tool 46 may present the developer 40 with an interface showing potentially conflicting changes made by the developer 40 and designer 30, among others. This allows the developer, in this embodiment, to manage the changes made by a designer, who may be less familiar with techniques for managing such changes, and unwilling or unable to do so.

The server 21 may also provide a version of the project stored as a single file 25 through network 100 to the designer's computer. For example, the multiple files 24a-n of the project may be packaged, archived, or otherwise combined as a single file and sent to the designer. This may happen, in some cases, in response to a designer 30 requesting access to the project 24 or otherwise checking out a version of the project 24 for editing. The project stored as a single file 25 can be stored in the memory 33 of the designer computer 31 and used by a design application 34. The design application 34 can provide various access functions 35, such as, for example, check out and check in functions used by the design application to check a project in and out of the server 21. The design application 34 may also include various editing functions 36 allowing the designer to make changes to the project. For example, the design application 34 may present a canvas area and display components for an application being developed. Those displayed components may represent the user interface of the application that is being developed. In some cases, a designer can edit, add to, or delete from the canvas area to specify or change the appearance of the user interface of the application being developed.

In an alternative embodiment, a design application 34 need not interact with a server 21. For example, in certain embodiments a project stored as a single file may be provided by a developer 40. For example, a developer may e-mail a file containing a copy of the project to the designer 30 for use within the development application 30. The designer 30 may edit the project and eventually return the changed file to the developer 40 who may then use development application 40 to integrate any changes into the project 24.

In the exemplary embodiment shown in FIG. 1, the design application comprises a temporary storage structure that is used to facilitate editing of the project stored as a single file 25. Such a storage structure may be an internal folder that includes temporary, editable copies of the project files 24a-24b. For example, when a designer 30 accesses and opens the single file project 25 using design application 34, the project that is stored as a single file may be used to create this storage structure that is then available to the design application to work with. In some cases, the design application can use these internal files in a similar way that a development application 44 uses the actual files 24a-n of the project 24. Indeed, there may be various common elements to a design application 44 and a development application 34 such that features of these applications do not need to be recreated differently for the different applications. For example, the development application 43 may access project files using the same or similar application programming interface function (API) calls as are used in the design application 34 to access files of a temporary storage structure 37.

The extracted files or other elements of a temporary storage structure 37 do not need to be exposed to the designer, who may simply see and work with the project stored as a single file 25. As one example, the designer may make changes to various components throughout the project causing changes to several of the files extracted in the temporary storage structure. The temporary storage structure 37 and/or other components of the design application 33 can track these changes so that the designer 30 can use undo to undo prior changes based on the order the changes were made and regardless of which extracted file was impacted by the change.

When the designer saves the project stored as a single file 25, the temporary storage structure 37 can be used to create and save the changed version of the project stored as a single file. The designer 30 can reopen the single file 25 and make additional changes. At some point, the designer 30 can send the changed version of the project stored as a single file 25 back to the server 21 for synchronization. The server 21 may then provide the changes from the changed version of the project 25 to the developer 40, who can use the merge tool to 46 to address any potential conflict or other versioning issues. In the meantime, the designer may check out, or receive from the developer, a new version of the project as a single file (such as, for example, one that includes changes from other designers and developers). Alternatively, the designer may continue working on their prior version of the project stored as a single file 25. In some embodiments, the designer is required to work on a new version but, in other embodiments, the designer is not restricted from working on prior versions.

The techniques for developing applications and the other features described herein have uses in a variety of contexts, not to be limited by the specific illustrations provided herein. The system shown in FIG. 1 is merely illustrative and is not intended to recite any system component or feature as essential or necessary to any embodiment.

Illustrative Embodiment of Working on an Application Development Project in Different Environments An application creation project may involve a multi-file structure of multiple source files, such as, for example, a file corresponding to the main application and a number of subcomponents represented by separate files. Certain embodiments present the project as a single file while creating a structure such as a folder that may be hidden or otherwise not exposed directly to the user. This structure or folder can mimic or represent the multi-file structure of the project and can be modified as the user interacts with the application to track ongoing changes. When the user takes action, some of those actions result in files or components of the structure or folder being updated. When the user hits "save" to save the project, the structure or folder can be saved as a single file.

Figure 2:
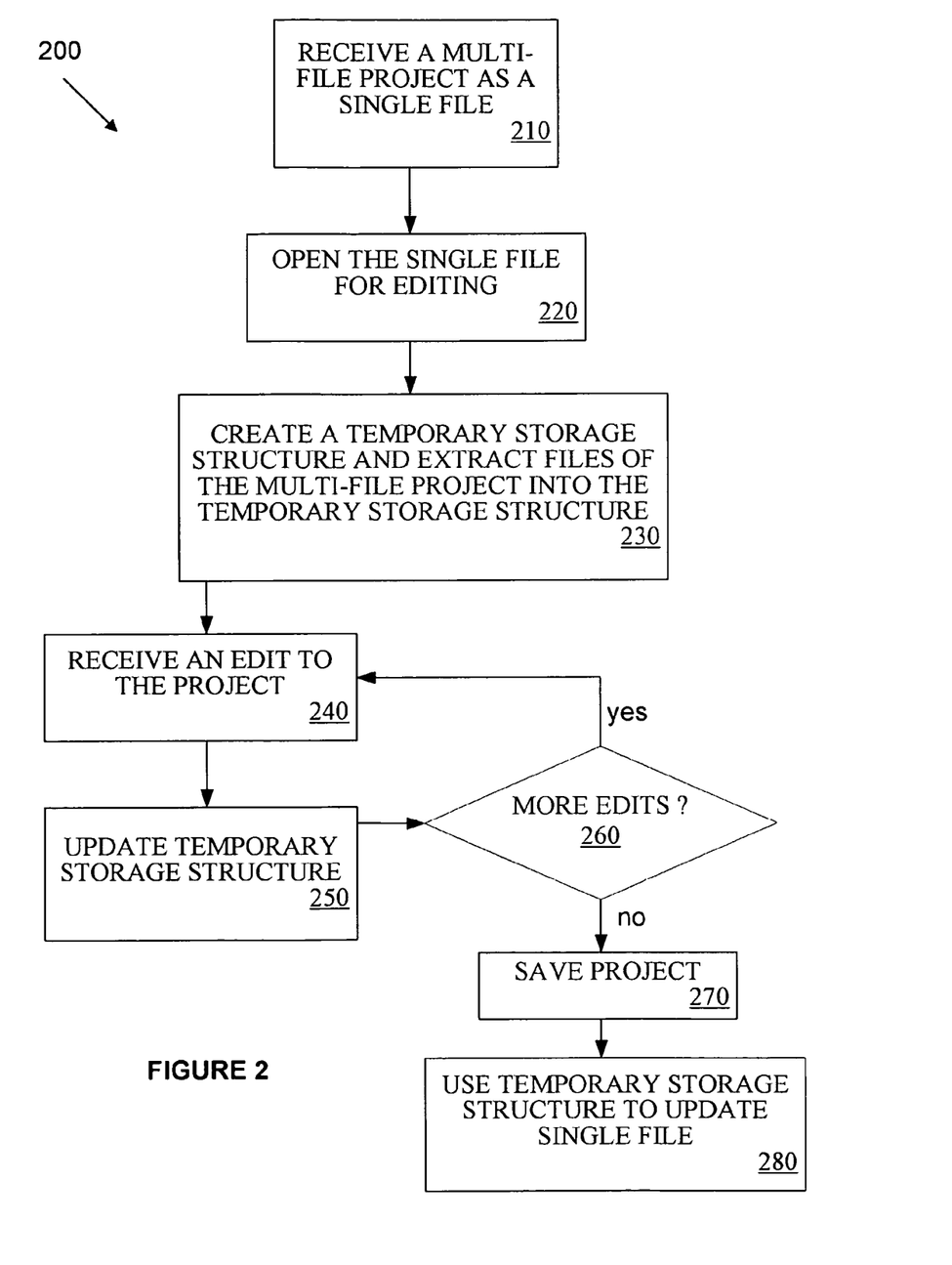
FIG. 2 illustrates a flow chart showing an exemplary method of presenting a multi-file project as a single file according to one embodiment.

FIG. 2 illustrates a flow chart showing an exemplary method of presenting a multi-file project as a single file according to one embodiment. The method 200 may comprise receiving a multi-file project as a single file, as shown in block 210. The file may be received from another server or computer and/or through any suitable medium including through a network such as the Internet, electronic mail, or on a disk or other portable storage device. The single file may comprise a compressed, archived, or otherwise packaged collection of the project that can be sent, received, and stored as a single unit.

The method 200 further comprises opening the single file for editing, as shown in block 220. For example, the file may be opened in an editing application that allows a designer, developer, or other user to view and/or make changes to one or more aspects of the project. Referring again to FIG. 1, a design application 34 may be used to access and open the single file.

The method 200 may comprise creating a temporary storage structure and extracting files of the multi-file project into the temporary storage structure, as shown in block 230. For example, upon opening the single file for editing in block 22, a design application may read the single file and extract pieces of the single file for individual manipulation and editing. For example, a packaged file may be unzipped into a folder of hidden temporary files. The folder can thus function like a scratch working area or temporary storage area.

The method 200 may further comprise receiving an edit to the project as shown in block 240. For example, a design application such as the design application 34 of FIG. 1 may present a designer, developer, or other user with a canvas area and allow the user to reposition components of an application's user interface on the canvas. As the user works with and otherwise edits the application on the design application, these edits can be tracked by the design application.

As shown in block 250, after an update the method 200 may involve updating the temporary storage structure 250. Such updating can, in some embodiments, occur periodically after a number of updates, and otherwise need not occur after each update. Generally, as a user makes changes, the files within the folder or other temporary storage structure may change without the user knowing or even being aware that such files are being used.

In certain embodiments, a design application can manipulate individual temporary files like a file available through an operating system. Individual files of a folder or other temporary storage structure may not merely be logical units, and instead the single file may literally be a packaged up representation of what could be individual files on disk that an operating system can access. In these and other cases, a design application may update the temporary files of a folder or other temporary storage structure using the same application programming interface (API) that is used to access and update operating system files.

As shown in decision triangle 260, if there are more edits, the method 200 returns to block 240 and processes the additional edits. However, as shown in block 270, if there are not more edits, the method 200 may further involve saving the project. Thus, as shown in block 280, upon a save the temporary storage structure is used to update the single file. If the user does not save, the original single file remains unchanged. The saved file can be reopened at a later time or provided to a central system or other user for synchronization, versioning, and other collaborative development functions.

The method 200 of FIG. 2 provides an example of an embodiment that allows a designer, developer, or other user to work with a single file that is an amalgamation of several individual physical files that are potentially worked with individually by other collaborators in a software development project. While the single file can be essentially a package file of multiple individual files, it may appear to the user to be just a single document representation. Thus, certain aspects of certain embodiments provide a development application or tool that presents an abstract view to a user of a collection of files as a single document in a way that allows the user to make changes to the content of those files without necessarily dealing with or even knowing about the existence of those individual files. Certain embodiments provide a method of presenting content from multiple files as a single document and allowing the user to edit any of that content and then reflecting changes back in those multiple underlying sources, without the user having to be aware that they are dealing with anything other than a single file and/or working in a single document.

Regardless of whether a project is packaged as a single file, certain embodiments involve techniques for presenting multiple project files for editing as if the editing were occurring on a single document. This can involve presenting document-type operations like undo, redo, save, close, revert, etc. and other editing operations that can change any file in a multi-file project without requiring a user to identify which file is changed. Providing these types of operations in the context of the project being presented as a single document may help a user feel as if he or she were working on a single document, even though the end result relates to multiple files.

For example, one embodiment comprises a computer implemented method that involves opening a multi-file project for editing in a development application and providing a single-document view of the multi-file project in the development application. The single-document view presents and allows editing of features from more than one file of the multi-file project in one place. For example, the single-document view may present such features on a graphical canvas area or within a single text editing window, among other ways. This exemplary method may comprise receiving an edit to the single-document view of the multi-file project, mapping the edit to one or more files of the multi-file project, and updating the files of the multi-file project based on the edit to the single-document view. Exemplary edits include, but are not limited to, a change to an object to be displayed, a change to an operation to be performed, a change to code, a change to text, an undo operation, a redo operation, a cut operation, a paste operation, an insert operation, a delete operation, a format operation, among many others. Accordingly, various cross-project functions, operation, and other edits can be implemented through an interface that presents a multi-file project as a single document and/or otherwise simplifies development of a multi-file project for a user.

Figure 3:
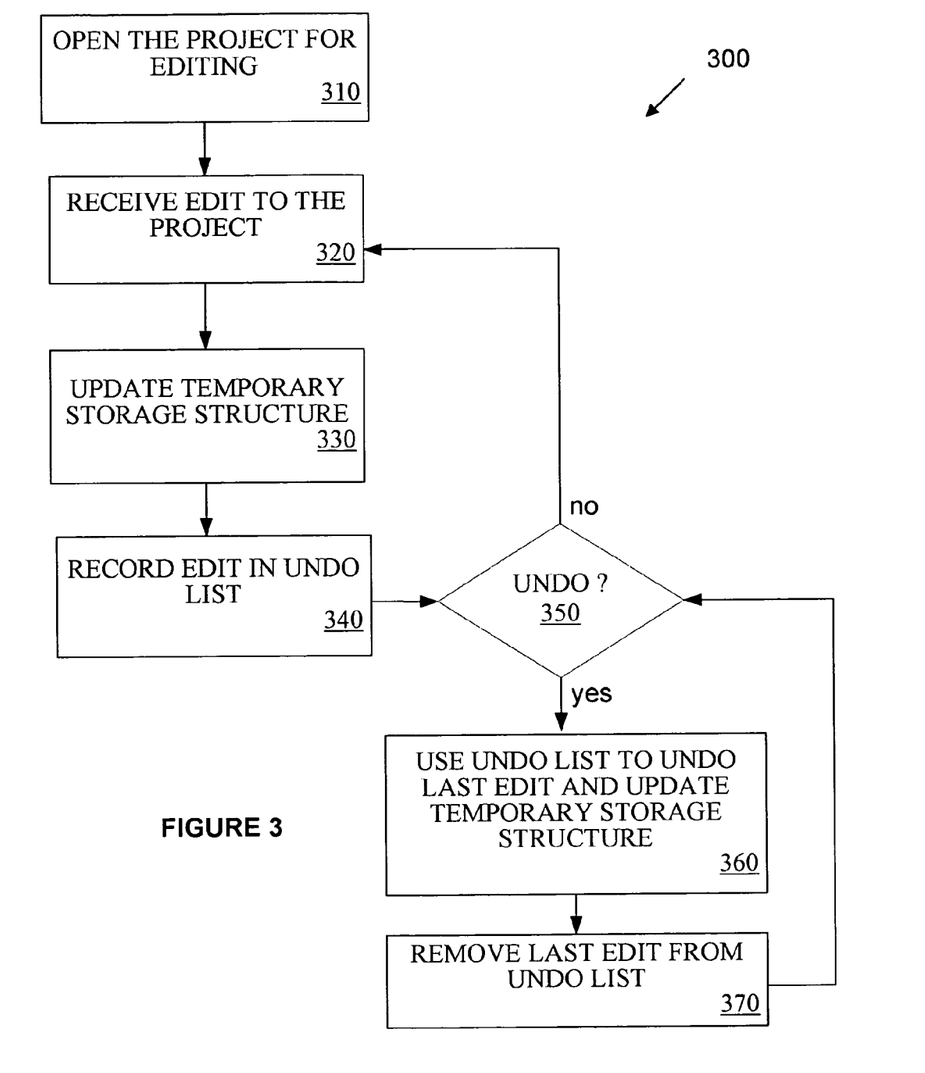
FIG. 3 illustrates a flow chart showing an exemplary method of presenting a cross-project undo function in a multi-file project according to one embodiment.

FIG. 3 illustrates a flow chart showing an exemplary method 300 of presenting a cross-project undo function in a multi-file project according to one embodiment. The method 300 may comprise opening a project for editing, as shown in block 310. For example, the project may have been accessed by receiving one or more files that can be used by a development application on a user's local computing device. Alternatively, project development may be hosted, for example, as a software product offered as a service over a network and the project may be opened through a remotely hosted application.

After opening the project, the method 300 further involves receiving an edit to the project, as shown in block 320. As described in the context of other embodiments herein, such an edit may be made in a variety of ways, including but not limited to, through a development or design application's editing interfaces and/or by a user entering text, manipulating graphical representations, or otherwise providing input or edits.

After receiving one or more edits, the method 300 further involves updating a storage structure based on the edits, as shown in block 330, and recording the edit or edits in an undo list, as shown in block 340. In certain embodiments, when the user performs actions that might affect different files in the project, all of those actions are recorded in a single undo list or stream, even though the actions may be associated with separate source code files. The use of such a single undo list or stream can ensure that the user can use an undo function in accordance with their prior experiences of an undo function that functions across an entire document rather than just with respect to a particular piece of the document. Thus, changes to different files in a temporary storage structure are all recorded sequentially in an undo list so that these changes can be undone in the reverse order that the user made the edits regardless of the file or files associated with a given edit. Note that, in some embodiments, a single entry in an undo list may encompass changes to multiple files in a project, while the entry may correspond to a single edit made by a user.

The method 300 further involves a user selecting or not selecting an undo command as shown in block 350. If an undo command is not selected, the method returns to block 320 for further editing. However, if an undo command is selected the method involves using the undo list to undo the last edit and update the temporary storage structure as shown in block 360. Accordingly, an editing interface can be updated to undo the last edit and any associated change made to the temporary storage structure can also be undone.

Finally, as shown in block 370, the method 300 can then involve removing the undone edit from the undo list. The method may alternatively comprise leaving the edit in the undo list and instead marking the edit in the undo list as undone. In this case, the a subsequent command to redo the edit can trigger a redoing of the edit using the edit still stored in the undo list and removing the marking that indicates that the edit was undone.

The method can then return to block 350 and determine whether another undo has been requested or not. In this way, a user is able to undo one edit after another in the reverse order from the order in which the edits were made regardless of the file or files of the multi-file project that was impacted by the edit. This can provide an editing experience with which a designer, developer, or other user is more familiar or comfortable.

Illustrative Embodiment of Collaboration in which Some Users are not Required to Merge Changes Collaborative development may involve allowing two or more users making changes concurrently to a same project. In such cases, various conflicts may result and can be addressed in a variety of ways. For example, a designer may be working with the appearance of a user interface and create a new state for a button component. At the same time, a developer may have decided that the button component is not necessary and delete it. Certain embodiments of the present disclosure address these and other issues by providing a mechanism for one user editing a project to simply provide a changed version of the project without having to be concerned about such changes. Such a user may be technically less sophisticated or otherwise desire to focus his or her efforts on other aspects of the project's creation. Instead, another user can manage the changes. In some cases, potential conflicts can be managed each time a given user checks a version of the project back in or otherwise provides their version of the project for synchronization or integration with the collaborative project.

An edited version of a multi-file project can be integrated with another copy of the project in a variety of ways. For example, a user may check back in the single file or send it to a particular other user for incorporation or synchronization with the multi-file project. Another user, such as a developer, can then merge the contents from what is presented as a single file into the multi-file project. A central server may be used in some embodiments. A central server is not used in some embodiments. In certain embodiments, a designer or other user may avoid having to address any source control issues. Unlike in traditional source control in which anyone submitting changes is typically responsible for merging their changes with any overlapping changes made by others during the same time frame, a designer can be insulated from such merging. A developer who is accepting changes from a designer's single file package can be responsible for the merge and in a position to do it properly.

An edited version of a project can be integrated with another copy of the project regardless of the forms in which the versions of the project are stored. For example, some embodiments integrate a multi-file version of a project with one or more other multi-file versions of the project. Some embodiments integrate a single file version of a project with one or more other single file versions of the project. Still other embodiments integrate various combinations of single and multiple file versions of a project. Thus, some embodiments will involve only single file versions of a project, some embodiments will involve only multiple file versions of a project, and some embodiments will involve versions of a project of both types.

In certain embodiments, a development project also involves a traditional source control system and a developer can provide a bridge function to a source control system for designers and other users wishing to avoid source control responsibility. From a designer's standpoint, he or she can simply check in their single file version of a project and have a developer or other user ensure changes are merged properly. Similarly, a designer can simply synchronize their version of the project by having the developer, other user, or system return another single file that replaces the designer's old one with one that includes the results of any mergers that have been accepted.

Suppose the designer is working with the appearance of a user interface and their changes create a new state for a component, a list box or a button. At the same time a developer may have decided that the component is not necessary and delete it. Or they re-factor and they move the component into a separate file. A developer may reorganize the project into smaller files.

Figure 4:
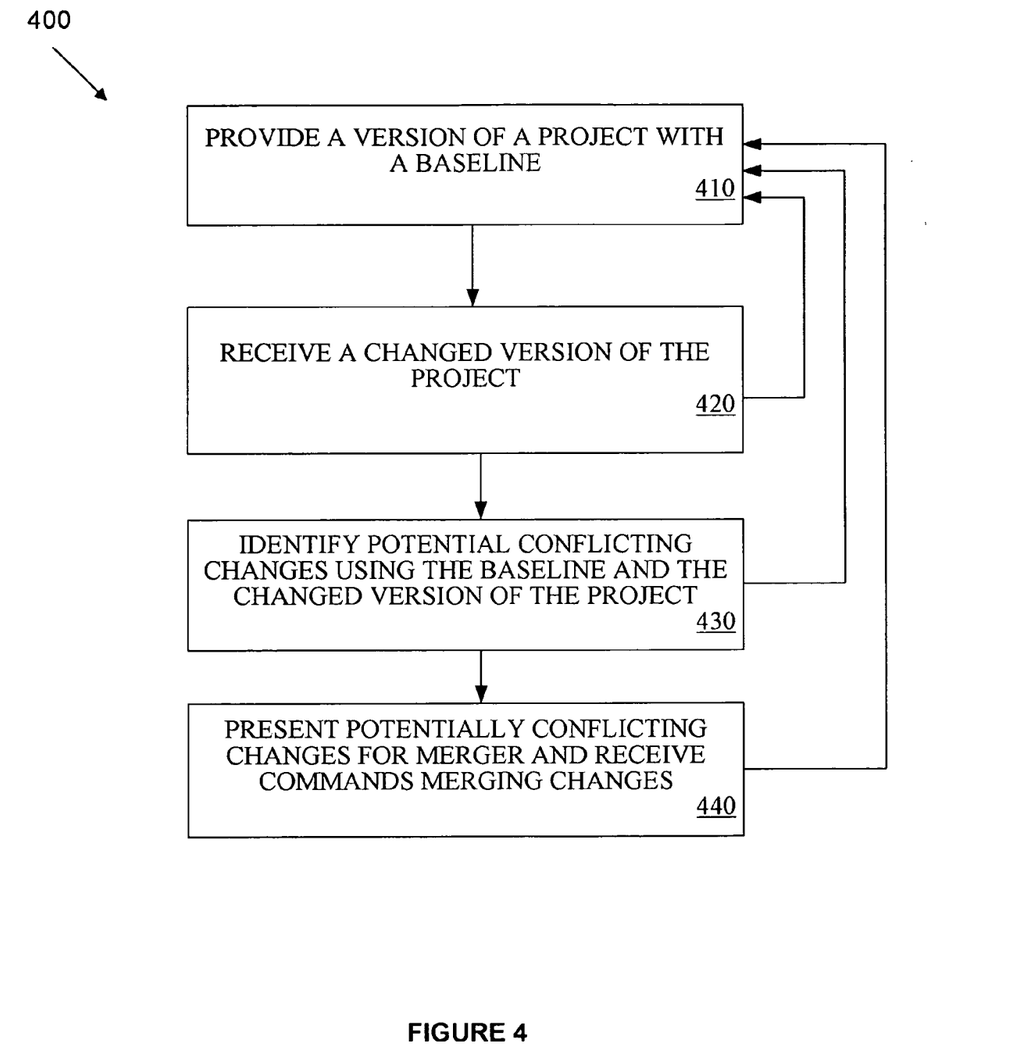
FIG. 4 illustrates a flow chart showing an exemplary method of collaboratively creating a software application and addressing potentially conflicting changes according to one embodiment.

FIG. 4 illustrates a flow chart showing an exemplary method 400 of collaboratively creating a software application and addressing potentially conflicting changes according to one embodiment. The method 400 comprises providing a version of a project for editing that includes a baseline, as shown in block 410. The baseline provides information that can be used at a later merger to identify potential conflicts. For example, when a single file is generated for use at a design tool, the file may include information about the current state of the project that provides a starting point or split point from which subsequent changes made to that version of the project and one or more other versions of the project can be compared. Such a baseline may be recorded inside the package file for example as metadata that is hidden from and not exposed to a developer, designer, or other user using the file.

The method 400 further comprises receiving a changed version of the project as shown in block 420. For example, a modified version of a single file provided to a designer may be checked back in or otherwise sent back to the source that originally provided the single file, or sent to a developer or other user other than the source that is capable of performing the merge. Changed files extracted from inside the single file can be compared using the baseline to identify the specific changes that were made. From the designer's standpoint, he or she has the ability to deposit changes without concern about the actual merger of those changes into the collaborative project. The designer may be able to continually check out and check in a project for editing regardless of whether there are any conflicts because such conflicts can be addressed by another person at potentially a later time.

The method 400 may further comprise identifying potential conflicts using the baseline and changed version of the project as shown in block 430. This may identify, for example, that a particular file of the project has been edited concurrently in different versions of the project so that the potentially conflicting situation can be flagged for a line by line granular merge. For example, a baseline may comprise a version of the file as it was prior to any changes and can thus be used to directly identify any changes. A baseline may be used to identify any changes made to other version of the project during the time period when the single file was checked out and being modified. For example, the baseline can be used to also identify changes made by separate developers to another version of the project. Any changes identified from the changed version of the project received at block 420 can be compared to any changes made separately by other developers to identify potential conflicts. Changes may be identified using a diff tool that is passed files identified as having potential differences from prior versions of the files.

As another example, a baseline may provide a simple timestamp or timestamps for all of the files that can be used to access a version of the project associated with one or more specific prior periods of time. Such prior versions can be used to identify changes. Alternatively, timestamps could be used on their own rather than to access a specific version based on time. For example, timestamps may be used to determine whether something has changed at all or not. If a file has the same timestamp as the baseline, it can be assumed that the file has no changes.

Another exemplary baseline provides a checksums of the files of a multi-file project that can be used to determine whether content has changed. Checksum use may be used to reduce or eliminate errors associated with inaccurate computer clocks, etc. In some cases, a baseline may comprise different types of information depending on the associated content. For example, a baseline may provide the content of certain files, e.g., a complete copy of the textual files and source code inside a project, but for images the baseline may use a checksum and/or timestamp.

A baseline may also be used to identify any changes made to other versions of the project during the time period when the single file was checked out and being modified. For example, the baseline can be used to also identify changes made by a separate developer to another version of the project. Any changes identified from the changed version of the project received at block 420 can be compared to any changes made separately by the other developer to identify potential conflicts.

The method 400 further comprises presenting potentially conflicting changes for merger and receive commands merging changes, as shown in block 440. This may involve providing information to a developer or other user regarding which files have potential conflicts. The developer may use a development application such as development application's 44 merge tool 46 shown in FIG. 1 to manage the merging of any conflicts that are identified. In some embodiments, potential conflicts are presented in a queue for a developer or other user to address at an appropriate or convenient time. The conflicts in such a queue need not be addressed immediately or all at once, but rather may remain pending or persistent. Thus, potential conflicts can remain flagged and unresolved while development continues. For example, the changes may be unresolved even though new versions of the project are checked out and edited.

In one embodiment, a designer or other user cannot continue to make changes to a project after sending the project, e.g., the single file, back for synchronization until an updated project/file is received. In another embodiment, a designer continues to work on the original single file after a merge rather than picking up the new copy that has the result of the merge. In some cases, a developer or other user addressing potential conflicts may see spurious conflicts flags being raised because he or she already performed a merge resolving some of the potential conflicts. This is because changes that were already resolved in a first merge might be misidentified as conflicts in the second merge. In some embodiments, a merge tool identifies and removes spurious potential conflicts, reducing or eliminating this problem, since the user may have previously merged a change.

The method 400 of FIG. 4 offers various advantages. For example, a developer or other user can modify a collaborative project and allow another person to essentially deal with potential conflict issues. This allows persons to collaborate directly in the creation of the project who would otherwise not be able to do so because of inability or unwillingness to address potentially technical and confusing conflict resolution and other issues with which software developers and other technical users are more familiar. For example, a designer can be isolated from having to think about or deal with any of the sort of responsibilities that a developer working on the source control typically takes on which includes synchronizing and merging conflicts upon synchronization and before submitting any changes. Instead, a designer may be free from any of those requirements. Those requirements can be placed on a developer or other user who is receiving the changes and who may act as the designer's liaison to a source control system.

In certain embodiments, a baseline is not stored in a version of a project that is provided to a designer or other user for editing. Instead, the baseline is stored in some other location and retrieved at an appropriate time so that conflict analysis and merging can take place. In other embodiments, a baseline is provided in the version of the project that is provided. This can provide various advantages, for example, when multiple versions of a project are checked out to one or more different designers. Associating a baseline with each checked out version of the project can help avoid confusion.

Generally, a baseline can be used in a variety of ways to facilitate detection of changes and conflicts and to facilitate merging when a designer or other user submits changes. A baseline can provide a common starting point for comparing changes made by multiple parties during a same time period. It can further help identify circumstances in which one party made a change based on an assumption that was true in their version but where a change made by another party broke that assumption.

Certain embodiments utilize a refactoring log to facilitate the identification of conflicts and/or suggest appropriate paths to resolve conflicts. The log may be stored as part of the project that is being edited to make the merger process easier in some cases. For example, if a designer adds a new state to a component and a developer has refactored the component by moving it into a different folder. One or more records of refactoring can be used to more easily identify exactly what changes have been made and how such changes were made.

Certain embodiments also use unique identifiers that are included in a version of a project to identify users and track the editing history of individual files of a multi-file project. For example, if a single file version of a project is opened by a designer and then passed back and forth between the designer and a second designer who make edits at different times, a system may be able to discern the identity of the user who made each particular edit or group of edits using unique identifiers embedded in metadata associated with the project. Among other things, this type of information may be used to facilitate the merger of changes, for example, to identify whether changes from a given user at a specific revision number or timestamp have already been merged. The same or a different unique identifier may also be used to identify that a particular project selected for merger is actually a different version of the same project.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

Certain embodiments provide techniques for collaboratively creating applications using a multiple source file project that can be accessed and edited like a single file. These embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices at environments 10, 20 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

That which is claimed:

1. A computer implemented method comprising:
receiving a single file for editing a multi-file project, the single file packaging multiple files of the multi-file project in the single file;
creating a temporary storage structure and extracting the multiple files of the multi-file project into the temporary storage structure;
extracting pieces from a plurality of the multiple files for editing on a displayed editing canvas of an editing application;
receiving an edit to the multi-file project;
updating the temporary storage structure using the edit to the multi-file project, the updating comprising identifying a file of the multi-file project extracted in the temporary storage structure to update, and updating the file using the edit to the multi-file project; and
saving an edited version of the single file using the temporary storage structure.

2. The method of claim 1, wherein the single file comprises representations that can be extracted as individual items that could be stored as files on a disk and accessed by an operating system.

3. The method of claim 1, wherein the temporary storage structure comprises a folder of hidden files that could be stored as files on a disk and accessed by an operating system.

4. The method of claim 3, wherein updating the temporary storage structure comprises using an application programming interface that is used to access and update operating system files.

5. The method of claim 1, wherein updating the temporary storage structure occurs after each of multiple edits is made to the multi-file project.

6. The method of claim 1, wherein updating the temporary storage structure occurs after multiple edits are made to the multi-file project.

7. The method of claim 1 further comprising reopening the edited version of the single file that was saved so that additional edits can be made.

8. The method of claim 1 further comprising sending the single file for synchronization with changes made to another version of the multi-file project.

9. The method of claim 1 further comprising implementing a single-document-type operation that operates on the multiple files of the multi-file project extracted into the temporary storage structure.

10. The method of claim 9, wherein the single-document-type operation is an undo operation.

11. The method of claim 9, wherein the single-document-type operation is a redo operation.

12. The method of claim 1, wherein the updating comprises identifying two or more files of the multi-file project to update and updating the two or more files using the edit to the multi-file project.

13. The method of claim 1 further comprising:
providing a version of a project for use in the editing application that allows the version of the project to be edited, the version of the project provided with a baseline usable to identify changes made during a time period associated with provision of the version of the project;
receiving a changed version of the project, the changed version of the project comprising the baseline;
identifying changes using the baseline and the changed version of the project; and
presenting the changes for merging with the project.

14. The method of claim 13 further comprising identifying a subset of the changes as potentially conflicting changes using changes made to another version of the project during the time period associated with the provision of the version of the project to the editing application, wherein the changes made to the another version of the project are identified using the baseline and the another version of the project.

15. The method of claim 14, wherein presenting the changes for merging with the project comprises distinguishing potentially conflicting changes from other changes.

16. The method of claim 13, wherein the version of the project is provided when the project is checked out, and the changed version of the project is received when the project is checked back in.

17. The method of claim 13, wherein the baseline is generated when the version of the project is provided.

18. The method of claim 13, wherein the baseline is recorded as metadata within a file provided to provide the version of the project.

19. The method of claim 13, wherein presenting the changes for merging with the project comprises identifying that a file of the project has been edited concurrently in different versions of the project.

20. The method of claim 19 further comprising flagging the file for a line by line granular merge.

21. The method of claim 13, wherein the baseline comprises a version of a file of the project as the file was prior to the version of the project being provided.

22. The method of claim 13, wherein the baseline comprises a timestamp that can be used to identify a particular version of the project.

23. The method of claim 13, wherein the baseline comprises a checksum that can be used to identify a particular version of the project.

24. The method of claim 13, wherein presenting the changes for merging with the project comprises presenting a queue of the changes that can be stored for later merger without interfering with provision of another version of the project.

25. The method of claim 13 further comprising receiving a refactoring log and using the refactoring log to present changes.

26. The method of claim 25, wherein the refactoring log is received as a part of the changed version of the project that is received.

27. The method of claim 13 further comprising receiving a unique identifier identifying a user responsible for a particular change in the changed version of the project.

28. The method of claim 13 further comprising receiving a second changed version of the project and identifying a second set of changes using the baseline and the second changed version of the project, wherein presenting the changes for merging with the project comprises presenting the changes, presenting the second set of changes, and identifying conflicts between the changes and the second set of changes.

29. A computer implemented method comprising:
opening a multi-file project for editing in a development application;
providing a single-document view of the multi-file project in the development application, the single-document view simultaneously presenting features from more than one file of the multi-file project on a displayed editing canvas;
receiving an edit to the single-document view of the multi-file project;
mapping the edit to a file of the multi-file project; and
updating the file of the multi-file project based on the edit to the single-document view.

30. The method of claim 29, wherein the edit is one of: a change to an object to be displayed, a change to an operation to be performed, a change to code, a change to text, an undo operation, a redo operation, a cut operation, a paste operation, an insert operation, a delete operation, or a format operation.

31. The method of claim 29, wherein mapping the edit maps the edit to more than one file of the multi-file project, and wherein the method further comprises updating more than one file of the multi-file project based on the edit to the single-document view.

32. A computer implemented method comprising:
opening a multi-file project for editing in a development application;
receiving an edit to the multi-file project;
updating a temporary storage structure using the edit to the multi-file project, wherein the temporary storage structure comprises multiple files of the multi-file project;
recording the edit in an undo list, wherein edits to different files of the multi-file project are recorded to the same undo list, wherein edits to the different files are recorded sequentially so that the edits can be undone in reverse order from an order in which the edits were made;

receiving a command to undo the edit; and
using the undo list to undo the edit and update the temporary storage structure based on the edit that has been undone.

33. The method of claim 32 further comprising receiving a command to redo the edit and redoing the edit using the undo list.

34. The method of claim 32 further comprising removing the edit from the undo list.

35. The method of claim 32 further comprising receiving multiple undo commands and, in response, sequentially undoing edits made to multiple files in a reverse order from an order in which the edits were made.

36. A method comprising:
executing instructions on a computing platform so that binary digital electronic signals representing a single file for editing a multi-file project are received in a memory location of the computing platform, the single file packaging, in the single file, multiple files of binary digital electronic signals associated with the multi-file project;
executing instructions on the computing platform to create a temporary storage structure in a memory location of the computing platform and extract the multiple files into the temporary storage structure;
executing instructions on the computing platform to extract pieces from a plurality of the multiple files for editing on a displayed editing canvas of an editing application;
executing instructions on the computing platform so that an edit operation to the multi-file project is received;
executing instructions on the computing platform to update the temporary storage structure using the edit operation, the update comprising identifying a file of the multiple files to update, and updating the file of the multiple files using the edit operation; and
executing instructions on the computing platform to save, in a memory location of the computing platform, an edited version of the single file using the temporary storage structure.

37. The method of claim 36 further comprising:
executing instructions on a computing platform so that binary digital electronic signals representing a single file for editing a multi-file project are provided for use in the editing application that allows the single file to be edited, the single file provided with a baseline usable to identify changes made during a time period associated with provision of the single file;
executing instructions on a computing platform so that binary digital electronic signals representing a changed version of the single file are received in a memory location of the computing platform, the changed version of the single file comprising the baseline;
executing instructions on a computing platform to identify changes using the baseline and the changed version of the single file; and
executing instructions on a computing platform to present the changes for merging with the multi-file project.

38. The method of claim 37 further comprising executing instructions on a computing platform to identify a subset of the changes as potentially conflicting changes using changes made to another version of the multi-file project during the time period associated with the provision of the single file to the editing application, wherein the changes made to the another version of the project are identified using the baseline and the another version of the project.

39. A system for developing an application, the system comprising:
a processor configured to execute instructions to provide:
an extraction component for receiving a single file, creating a temporary storage structure, and extracting files of a multi-file project into the temporary storage structure, the single file packaging multiple files of the multi-file project within the single file;
an editing interface for extracting pieces from a plurality of the multiple files for editing on a displayed editing canvas of an editing application, receiving an edit to the multi-file project, and updating the temporary storage structure using the edit to the multi-file project, the updating comprising identifying a file of the multi-file project extracted in the temporary storage structure to update, and updating the file using the edit to the multi-file project; and
a saving component for saving an edited version of the single file using the temporary storage structure.

40. The system of claim 39, wherein the editing interface identifies two or more files of the multi-file project to update and updates the two or more files using the edit to the multi-file project.

41. A non-transitory computer-readable medium on which is encoded program code, the program code comprising:
program code for receiving a single file for editing a multi-file project, the single file packaging multiple files of the multi-file project in the single file;
program code for creating a temporary storage structure and extracting the files of the multi-file project into the temporary storage structure;
program code for extracting pieces from a plurality of the multiple files for editing on a displayed editing canvas of an editing application;
program code for receiving an edit to the multi-file project;
program code for updating the temporary storage structure using the edit to the multi-file project, the updating comprising identifying a file of the multi-file project extracted in the temporary storage structure to update, and updating the file using the edit to the multi-file project; and
program code for saving an edited version of the single file using the temporary storage structure.

42. The computer-readable medium of claim 41, the program code further comprising:
program code for providing a version of a project for use in the editing application that allows the version of the project to be edited, the version of the project provided with a baseline usable to identify potentially conflicting changes made during a time period associated with provision of the version of the project;
program code for receiving a changed version of the project, the changed version of the project comprising the baseline;
program code for identifying changes using the baseline and the changed version of the project; and
program code for presenting the changes for merging with the project.

* * * * *